United States Patent
Sugimoto et al.

(10) Patent No.: US 9,455,452 B2
(45) Date of Patent: Sep. 27, 2016

(54) FUEL CELL AND METHOD OF MANUFACTURE THEREOF

(75) Inventors: Masakazu Sugimoto, Kyoto (JP); Masaya Yano, Kyoto (JP)

(73) Assignee: ROHM CO., LTD., Kyoto-Shi (JP)

(*) Notice: Subject to any disclaimer, the term of this patent is extended or adjusted under 35 U.S.C. 154(b) by 0 days.

(21) Appl. No.: 12/993,288

(22) PCT Filed: May 20, 2009

(86) PCT No.: PCT/JP2009/059269
§ 371 (c)(1),
(2), (4) Date: Nov. 18, 2010

(87) PCT Pub. No.: WO2009/145090
PCT Pub. Date: Dec. 3, 2009

(65) Prior Publication Data
US 2011/0091792 A1    Apr. 21, 2011

(30) Foreign Application Priority Data

May 26, 2008  (JP) .................................. 2008-136905
May 30, 2008  (JP) .................................. 2008-143053

(51) Int. Cl.
*H01M 8/02* (2006.01)
*H01M 8/10* (2016.01)

(52) U.S. Cl.
CPC ......... *H01M 8/0202* (2013.01); *H01M 8/0271* (2013.01); *H01M 8/0297* (2013.01); *H01M 2008/1095* (2013.01); *Y02E 60/50* (2013.01); *Y02P 70/56* (2015.11)

(58) Field of Classification Search
USPC ....................................................... 429/167
See application file for complete search history.

(56) References Cited

U.S. PATENT DOCUMENTS

| | | |
|---|---|---|
| 6,127,058 A | 10/2000 | Pratt et al. |
| 7,005,205 B1 | 2/2006 | Gyoten et al. |
| 7,838,172 B2 | 11/2010 | Wada et al. |
| 2002/0197523 A1 | 12/2002 | Ohara et al. |
| 2003/0152819 A1 | 8/2003 | Hatoh et al. |

(Continued)

FOREIGN PATENT DOCUMENTS

| | | |
|---|---|---|
| CN | 1291801 A | 4/2001 |
| EP | 1 246 281 A1 | 10/2002 |

(Continued)

OTHER PUBLICATIONS

JP 2005-011624 to Wada et al, machine English translation.*

(Continued)

*Primary Examiner* — Lucas J O Donnell
(74) *Attorney, Agent, or Firm* — Knobbe Martens Olson & Bear LLP

(57) ABSTRACT

Provided are a fuel cell making it possible to make contact pressures high between its electrode layers and its metallic layers and others, thereby improving the power of the cell, and a method for manufacturing the cell. A fuel cell of the invention comprises a solid polymer electrolyte layer (1), first and second electrode layers (2, 3) located on each of both sides of the solid polymer electrolyte layer (1), and first and second electroconductive layers (4, 5) arranged outside the first and second electrode layers (2, 3), respectively, the individual layers (1 to 5) being integrated with each other through a resin molded body (6) which is an insert-molded body.

10 Claims, 8 Drawing Sheets

(56) References Cited

U.S. PATENT DOCUMENTS

| | | |
|---|---|---|
| 2004/0137307 A1 | 7/2004 | Okonogi et al. |
| 2005/0026026 A1* | 2/2005 | Yen et al. ............ 429/36 |
| 2005/0048346 A1 | 3/2005 | Fannon et al. |
| 2005/0048349 A1 | 3/2005 | Fannon et al. |
| 2005/0089598 A1 | 4/2005 | Ohara et al. |
| 2005/0249998 A1 | 11/2005 | Minas et al. |
| 2006/0194092 A1* | 8/2006 | Kanai et al. ............ 429/34 |
| 2007/0015043 A1* | 1/2007 | Bai et al. ............ 429/44 |
| 2007/0065712 A1 | 3/2007 | Wada et al. |
| 2007/0072058 A1 | 3/2007 | Koyama et al. |
| 2007/0087253 A1 | 4/2007 | Fannon et al. |
| 2007/0231662 A1 | 10/2007 | Goto et al. |
| 2008/0070082 A1* | 3/2008 | Norimatsu et al. ........ 429/27 |
| 2008/0251753 A1 | 10/2008 | Sugita et al. |
| 2009/0017354 A1 | 1/2009 | Yano et al. |
| 2009/0068526 A1 | 3/2009 | Ohara et al. |
| 2009/0267252 A1* | 10/2009 | Ikeyama ............ 264/40.1 |
| 2010/0055530 A1 | 3/2010 | Kawajiri et al. |
| 2011/0027667 A1* | 2/2011 | Sugimoto et al. ........ 429/410 |

FOREIGN PATENT DOCUMENTS

| | | |
|---|---|---|
| JP | 11-339836 A | 12/1999 |
| JP | 2001-266910 A | 9/2001 |
| JP | 2003-163026 A | 6/2003 |
| JP | 2003/217365 A | 7/2003 |
| JP | 2005-11624 A | 1/2005 |
| JP | 2005011624 A * | 1/2005 |
| JP | 2005-150008 A | 6/2005 |
| JP | 3115434 U | 9/2005 |
| JP | 2006-66323 A | 3/2006 |
| JP | 2006-236686 A | 9/2006 |
| JP | 2007-42348 A | 2/2007 |
| JP | 2007-128908 A | 5/2007 |
| JP | 2007-157438 A | 6/2007 |
| JP | 2007-265918 A | 10/2007 |
| JP | 2007-95401 A | 12/2007 |
| JP | 2008-4311 A | 1/2008 |
| JP | 2008-47437 A | 2/2008 |
| JP | 2008-52953 A | 3/2008 |
| JP | 2008-18119 A | 8/2008 |
| JP | 2008-181889 A | 8/2008 |
| JP | 2008-218304 A | 9/2008 |

OTHER PUBLICATIONS

Office Action issued Aug. 2, 2012 in corresponding Chinese Application No. 200980106227.1

Office Action mailed Dec. 26, 2012 in corresponding Japan Patent Application No. 2008-143053.

Office Action dated Mar. 21, 2013 in corresponding Chinese Application No. 200980106227.1.

Extended Search Report issued Mar. 17, 2014, in corresponding EP application No. 09754598.2.

Office Action issued Mar. 11, 2014, in corresponding TW application No. 098117278.

Office Action issued Sep. 10, 2014 in corresponding Taiwan Patent Application No. 098117278.

* cited by examiner

FUEL CELL AND METHOD OF MANUFACTURE THEREOF

This application is the U.S. National Phase under 35. U.S.C. §371 of International Application PCT/JP2009/059269, filed May 20, 2009, which claims priority to Japanese Patent Application No. 2008-136905, filed May 26, 2008 and Japanese Patent Application No. 2008-143053, filed May 30, 2008. The International Application was published under PCT Article 21(2) in a language other than English.

TECHNICAL FIELD

The present invention relates to a fuel cell constituted by individual layers integrated with each other through a resin, and a method of the manufacture thereof. The invention is particularly useful as a fuel cell used in a mobile instrument (portable instrument) or the like.

BACKGROUND ART

With development in IT in recent years, lithium ion secondary cells are used as power sources for almost all mobile instruments such as portable telephones, notebook-size personal computers, and digital camera. However, with an improvement in the performances of these mobile instruments, the power consumption thereof tends to become increasingly large. Attention has been paid to fuel cells, which are clean and high in efficiency, for power sources or for charging the instruments.

As such a small-sized and light fuel cell, known is a fuel cell as described in, e.g., Patent Document 1 described below, which has a solid polymer electrolyte in a plate form, an anode side electrode plate arranged on one of both sides thereof, a cathode side electrode plate arranged on the other side, an anode side metallic plate arranged on the outside of the anode side electrode plate, and a cathode side metallic plate arranged on the outside of the cathode side electrode plate, wherein the outer circumferential regions of these metallic plates are fastened onto each other to interpose an insulating member therebetween, thereby sealing the fuel cell. However, the sealing based on the fastening of the metallic plates results in problems that the process becomes complicated and precision is required for controlling the thickness of the fastened region.

Thus, in order to make the sealing step simple, Patent Document 2 described below suggests a fuel cell having a solid polymer electrolyte in a plate form, and electrode plates and metallic plates that are equivalent to those of the above-mentioned fuel cell, wherein a sealing material such as epoxy resin is used to seal only circumferential edge regions of both of the metallic plates while an insulating member is interposed therebetween.

Patent Document 3 described below suggests a cell member for a fuel cell, which has a solid polymer electrolyte in a plate form, and electrode plates (each composed of a catalyst layer plus an electroconductive porous body) each arranged on both sides of the electrolyte, wherein the circumferences of the individual layers are integrated with each other through an insert-molded resin frame. In this invention, electroconductive members (a connecting member 18 and others) for leading out electricity to the outside are arranged outside the resin, and contact the electroconductive porous bodies at small areas. The electroconductive members are not covered with the resin.

PRIOR ART DOCUMENTS

Patent Documents

Patent Document 1: JP-A-2005-150008
Patent Document 2: Japanese Registered Utility Model No. 3115434
Patent Document 3: JP-A-2005-11624

DISCLOSURE OF THE INVENTION

Problems to be Solved by the Invention

However, the fuel cell in Patent Document 2 has a structure wherein only the circumferential edge regions of the metallic plates on both the sides are sealed; thus, a lowering tends to be caused in the pressure against the contact surface between each of the metallic plates on both the sides and the corresponding one of the inside electrode plates. This causes a cell resistance to result in a problem that the power of the cell falls, and other problems. Even if the circumferential edge regions are sealed in the state that the metallic plates on both the sides are pressured at the time of the manufacture, the pressure against the contact surface tends to lower gradually. Furthermore, the insulating member needs to be interposed between the metallic plates so as to cause problems that the manufacturing process becomes complicated and many members are required.

About the cell member for a fuel cell in Patent Document 3, the structure and the manufacturing process thereof are simple since the cell member is an insert-molded member. However, the cell member has a structure wherein only the circumferences are fixed and bonded to each other through the resin frame; it is therefore difficult to lead out electricity effectively to the outside. In other words, electroconductive members need to be brought into contact with the electroconductive porous bodies, in order to lead out electricity, but in the structure wherein only the circumferences are fixed and bonded to each other through the resin frame and the electroconductive members are arranged outside the resin, the electroconductive members cannot be brought into contact with the electrode plates, at a sufficient pressure. This causes a cell resistance to result in a problem that the power of the cell falls, and other problems.

Thus, an object of the present invention is to provide a fuel cell making it possible to make contact pressures high between its electrode layers and its metallic layers and others, thereby improving the power of the cell, and a method for manufacturing the cell.

Means for Solving the Problems

The above-described object can be attained according to the following present invention.

A fuel cell of the present invention comprises a solid polymer electrolyte layer, first and second electrode layers located on each of both sides of the solid polymer electrolyte layer, and first and second electroconductive layers arranged outside the first and second electrode layers, respectively, the individual layers being integrated with each other through a resin molded body which is an insert-molded body.

According to the fuel cell of the present invention, the solid polymer electrolyte layer, the electrode layers, and the electroconductive layers are integrated with each other through the resin molded body, which is a body insert-molded by use of these layers; therefore, the electroconductive layers are held by the resin molded body, so that the respective contact pressures between the electroconductive layers and the electrode layers can be made high. Thus, the contact resistances can be decreased to improve the power of the cell. In other words, a fuel cell giving a high cell power can be produced while the cell has a simple structure insert-molded by use of the individual layers. When the insert molding is performed, the first and second electroconductive layers are pressured from both the sides in accordance with the injection pressure of the resin; however, the respective contact pressures between the electroconductive layers and the electrode layers can be made higher by performing another pressuring by use of one or more convex portions located in (one of) the inner surfaces of the mold. When electric power is generated, a fuel, oxygen and others are supplied to the first and second electrode layers through openings or channels made in the resin molded body, whereby the electric power generation can be attained by reactions in the respective electrodes and ion conduction in the solid polymer electrolyte layer.

In the invention, it is preferred that the resin molded body has supplying regions for supplying a gas or liquid to the first and second electrode layer. The supplied gas may be a fuel gas such as hydrogen gas, oxygen-containing gas such as air, or the like. The supplied liquid may be methanol, or the like.

In the description above, it is preferred that the first electroconductive layer comprises a first metallic layer having an uncovering region for making the first electrode layer partially uncovered, and the second electroconductive layer comprises a second metallic layer having an uncovering region for making the second electrode layer partially uncovered. The electroconductive layers may each be a layer having gas permeability. The electroconductive layers have the uncovering regions, thereby making it possible to supply a gas or liquid into the electrode layers through the uncovering regions. Moreover, the use of the metallic layers makes it possible that a larger electric current can be led out compared with the use of any other material.

In the description above, it is preferred that the supplying regions of the resin molded body are each an opening provided at a position of the resin molded body which corresponds to the uncovering region of the first or second metallic layer. According to this structure, the opening in the resin molded body is provided at the position corresponding to the uncovering region of the metallic layer; therefore, a gas or liquid can be supplied to the electrode layer through the opening and the uncovering region. As a result, electric power can be effectively generated.

It is also preferred that a porous layer is interposed between the openings in the resin molded body and the first or second electrode layer. This makes it possible to prevent a deterioration of the electrode layer caused by the adhesion of contaminants thereto, or some other cause while the supply of a gas or liquid is made possible.

Moreover, it is preferred that unit cells that are each the fuel cell as described above are integrated with each other through the resin molded body. It is also preferred that the unit cells are arranged in parallel to each other in the same plane. By arranging the unit cells to each other, for example, in series, the outputted voltage can be made high, and the fuel cells can be obtained in the form of a united body giving a high outputted voltage.

It is also preferred that the fuel cell comprises one or more joint regions for connecting the electroconductive layers of the unit cells electrically to each other, the joint regions being integrated with each other through the resin molded body. According to this fuel cell, the unit cells are electrically connected to each other through the joint region(s), and the cells are integrated with each other through the insert-molded resin mold body. As a result, the structure or step for connecting the unit cells to each other becomes simple, and a fuel cell is obtained which is good in the reliability of its joint region(s) and in durability.

On the other hand, a method for manufacturing a fuel cell of the present invention comprises a step of arranging, into a mold, a lamination of a solid polymer electrolyte layer, first and second electrode layers located on each of both sides thereof, and first and second electroconductive layers arranged outside the first and second electrode layers, respectively, and a step of injecting a resin into the mold, thereby molding a resin molded body for integrating the elements of the lamination with each other.

According to the fuel cell manufacturing method of the present invention, the lamination, which is made of the solid polymer electrolyte layer, the electrode layers and the electroconductive layers, is used, and these elements are integrated with each other through the resin molded body, which is an insert-molded body, so that the electroconductive layers are held by the resin molded body. Thus, the respective contact pressures between the electroconductive layers and the electrode layers can be made high, whereby the respective contact resistances can be decreased so that the power of the cell can be improved. In short, a fuel cell giving a high cell power can be obtained while the structure thereof or the manufacturing method therefor is a simple structure or manufacturing method, wherein the individual layers are used to perform insert molding.

Preferably, a method for manufacturing a fuel cell of the present invention comprises a step of arranging, into a mold, a lamination of a solid polymer electrolyte layer, first and second electrode layers located on each of both sides thereof, and first and second metallic layers arranged outside the first and second electrode layers, respectively, and having uncovering regions for each making the first and second electrode layers partially uncovered, and a step of injecting a resin into the mold in the state that the first and second metallic layers are pressured from both the sides, thereby molding a resin molded body for integrating the elements of the lamination with each other, the body having supplying regions for supplying a gas or liquid to the first and second electrode layers.

According to this manufacturing method, the first and second metallic layers have the uncovering regions for making the first and second electrode layers, respectively, uncovered, and further the lamination is arranged into the mold and then the resin is injected thereinto so as to mold the resin into the resin molded body, which has the supplying regions for supplying a gas or liquid to the electrode layers. A fuel, oxygen and so on can be supplied to the electrode layers through the supplying regions. As a result, electric power can be generated by reactions in the respective electrodes, and ion conduction in the solid polymer electrolyte. At this time, the resin is insert-molded in the state that the first and the second metallic layers are pressured from both the sides; thus, the pressures when the metallic layers on both the sides contact the electrode layers increase. As a result, the cell resistance decreases so that the power of the cell is improved.

In the description above, it is preferred that the mold is made into divided structures, one or more convex portions are located in an inner surface of the divided mold members, and in the state that the convex portion(s) is/are brought into contact with the first or second metallic layer under pressure, the resin is injected into the mold. In this case, the cell is sealed up with the resin in the state that the first or second metallic layer is pressured by effect of the convex portion (s) in the inner surface of the mold members, so that the elements of the lamination are integrated with each other. For this reason, the pressures when the metallic layers on both the sides each contact the electrode layers increase with a higher certainty.

It is also preferred that a plurality of openings are made in the front surface of the first or second metallic layer, and the convex portions each having a larger upper surface than each of the openings are each made at positions corresponding to the openings in the divided mold members. In this case, the surroundings of the openings in the metallic layer can be pressured by effect of the convex portions of the inner surface of the mold members. This makes it possible to increase the contact pressure between the metallic layer and the corresponding electrode layer. By stuffing the uncovering portions of the metallic layer with the convex portions at the same time, the uncovering regions can be prevented from being covered with the resin, so that the first or second electrode layer can be made naked from the uncovering regions.

It is also preferred that, in the step of arranging the lamination into a mold, use is made of a plurality of laminations, the laminations are arranged in the mold in parallel to each other in the same plane in the state that the laminations are electrically connected to each other. According to this manufacturing method, by connecting the laminations to each other, for example, in series, the outputted voltage can be made high, and the fuel cells can be manufactured in the form of a united body giving a high outputted voltage. The manufacturing efficiency can also be made high.

It is also preferred that the lamination, and one or more laminations equivalent to the lamination are arranged in the mold in the state that the electroconductive layers of any one of the laminations and the other or another of the laminations are electrically connected to each other through one or more joint regions. According to this fuel cell manufacturing method, the electroconductive layers of the laminations, which constitute the unit cells, are electrically connected to each other through the joint region(s), and the cells are integrated with each other through the insert-molded resin mold body. As a result, the structure or step for connecting the unit cells to each other becomes simple, and a fuel cell can be manufactured which is good in the reliability of its joint region(s) and in durability.

BRIEF DESCRIPTION OF THE DRAWINGS

FIG. 7(a) and FIG. 7(b) are a top view thereof, and a sectional front view thereof, respectively.

FIGS. 8(a), 8(b) and 8(c) are a top view thereof, a sectional thereof which is viewed in the direction of arrows I-I, and a sectional thereof which is viewed in the direction of arrows II-II, respectively.

MODES FOR CARRYING OUT THE INVENTION

First Embodiment

Figure 1:
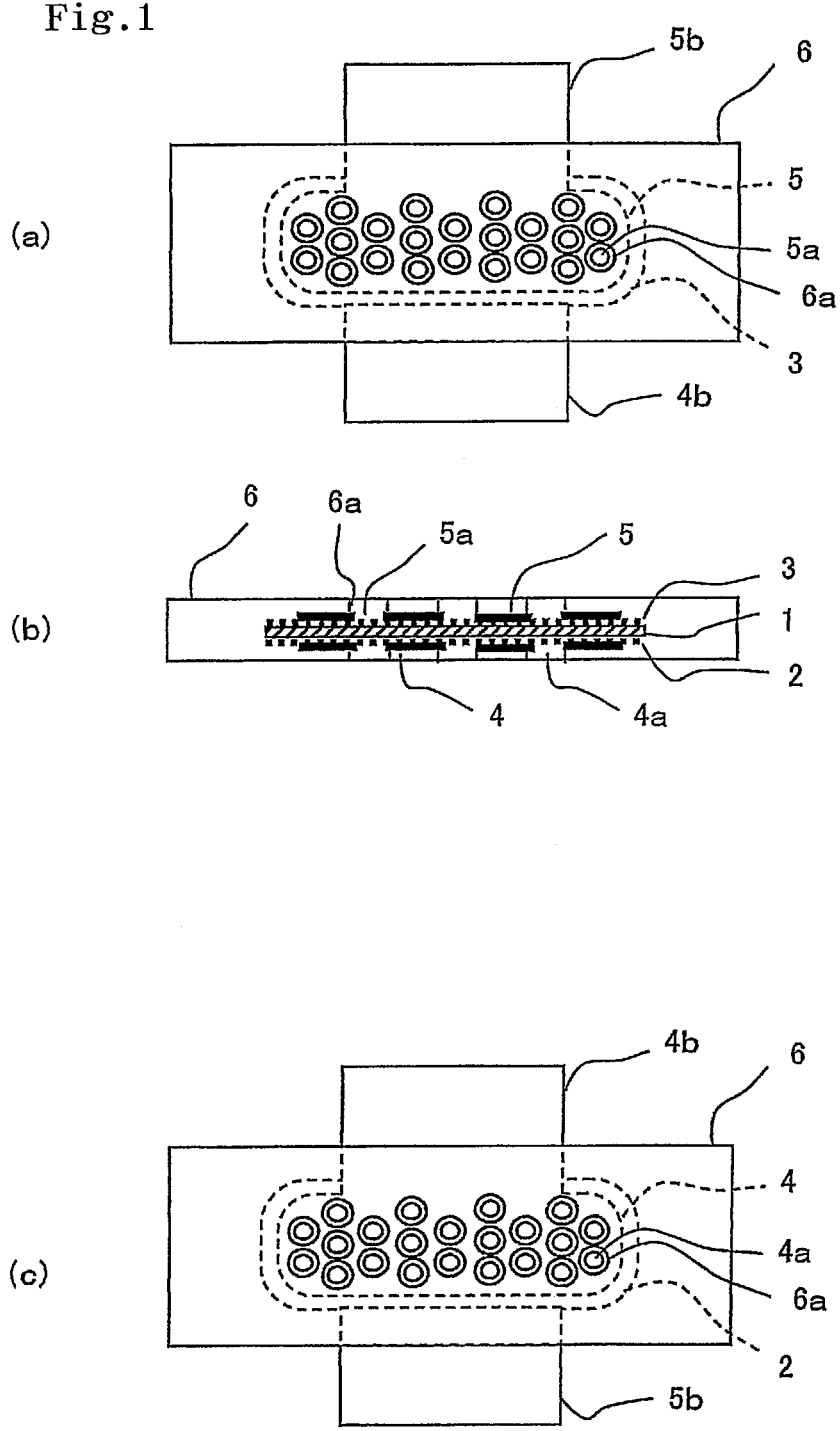
FIG. 1 The figures are views illustrating an example of the fuel cell of the invention, and FIGS. 1(a), (b) and (c) are a top view thereof, a sectional front view thereof, and a bottom view thereof, respectively.

Referring to the drawings, a preferred embodiment of the fuel cell according to the invention will be described. FIG. 1 is views illustrating an example of the fuel cell of the invention, and FIGS. 1(a), 1(b) and 1(c) are a top view thereof, a sectional front view thereof and a bottom view thereof, respectively.

As illustrated in FIG. 1, the fuel cell of the invention has a solid polymer electrolyte 1, a first electrode layer 2 and a second electrode layer 3 laid on each of both sides of the solid polymer electrolyte layer 1, and a first electroconductive layer and a second electroconductive layer arranged outside the electrode layers 2 and 3, respectively. In the present embodiment, shown is an example wherein the first electroconductive layer and the second electroconductive layer are a first metallic layer 4 and a second metallic layer 5, respectively, the layers 4 and 5 having uncovering regions for making respective portions of the first electrode layer 2 and the second electrode layer 3 partially uncovered (i.e., naked).

Examples of the material of the electroconductive layers include metals, electroconductive polymers, electroconductive rubbers, electroconductive fibers, electroconductive pastes, and electroconductive paints.

The solid polymer electrolyte layer 1 may be any solid polymer electrolyte layer as far as the layer is a layer usable in a conventional solid polymer membrane type fuel cell. From the viewpoint of chemical stability and electroconductivity, it is preferred to use a cation exchange membrane made of a perfluorocarbon polymer having a sulfonic acid group, which is a superacid. The cation exchange membrane is preferably a NAFION (registered trade name). Other examples thereof include a product wherein a porous membrane made of a fluorine-contained resin, such as polytetrafluoroethylene, is impregnated with the NAFION or some other ion conductive materials, and a product wherein the NAFION or some other ion conductive material is carried on a porous membrane or nonwoven cloth made of a polyolefin resin, such as polyethylene or polypropylene.

It is more effective for making the whole thinner to make the thickness of the solid polymer electrolyte layer 1 smaller. Considering the ion conducting function, strength and handleability thereof, and others, the thickness is preferably from 25 to 50 μm although a thickness of 10 to 300 μm is usable.

The electrode layers 2 and 3 are not limited as far as the layers are layers that cause electrode reactions on the anode side and the cathode side near the respective surfaces of the solid polymer electrolyte layer 1. The layers 2 and 3 are in particular preferably layers which each function as a gas diffusion layer to supply and discharge a fuel gas, a fuel liquid, an oxidizing gas and water vapor, and simultaneously each exhibit a power collecting function. The electrode layers 2 and 3 may be the same layers or different layers. It is preferred to carry a catalyst having an electrode catalyst effect onto base materials or base members of the layers. It is preferred to carry the catalyst onto at least the inner surface side (of each of the layers 2 and 3) which contacts the solid polymer electrolyte layer 1.

The electrode base materials of the electrode layers 2 and 3 may each be, for example, a fibrous carbon such as carbon paper and carbon fiber nonwoven cloth, an electroconductive-polymeric-fiber-collected body, or some other electroconductive porous material. The electrode layers 2 and 3 may be electrode layers 2 and 3 in each of which the catalyst is caused to adhere directly onto the solid polymer electrolyte layer 1, or in each of which the catalyst is carried onto electroconductive particles of carbon black or the like and the catalyst-carried particles are caused to adhere onto the solid polymer electrolyte layer 1.

In general, the electrode layers 2 and 3 are produced by adding, to such an electroconductive porous material, a water repellant material such as fluorine-contained resin. When the catalyst is carried thereon, the catalyst such as finely particulate platinum is mixed with the water repellant material such as fluorine-contained resin, a solvent is incorporated into this mixture to make the mixture into a paste or ink form, and then the resultant is painted onto a single surface of each of the electrode base members which should be opposed to the solid polymer electrolyte layer.

In general, the electrode layers 2 and 3, and the solid polymer electrolyte layer 1 are designed to be matched with a reducing gas and an oxidizing gas supplied to the fuel cell. In the invention, it is preferred to use air as the oxidizing gas and use hydrogen gas as the reducing gas. Instead of the reducing gas, a liquid fuel such as methanol may be used.

In the case of using, for example, hydrogen gas and air, a reaction is caused between oxygen and hydrogen ions in the second electrode layer 3 in the cathode side, which is a naturally air-supplied side (in the present specification, it is supposed that the first electrode layer is in the anode side and the second electrode layer is in the cathode side). As a result, water is produced. It is therefore preferred that a design is made so as to be matched with this electrode reaction. In particular, under driving conditions of a low operating temperature, a high current density and a high gas utilization rate, there is easily caused a flooding phenomenon of the electrode porous body based on the condensation of water vapor, in particular, in the air electrode, where water is produced. Accordingly, in order to gain stable characteristics of the fuel cell over a long term, it is effective to keep the water repellency of the electrodes certainly not to cause the flooding phenomenon.

The catalyst may be at least one selected from platinum, palladium, ruthenium, rhodium, silver, nickel, iron, copper, cobalt and molybdenum, or may be any oxide thereof. It is allowable to use a product wherein the catalyst is beforehand carried on carbon black or the like.

It is more effective for making the whole thinner to make the thickness of the electrode layers 2 and 3 smaller. Considering the electrode reaction, the strength and handleability thereof, and others, the thickness is preferably from 1 to 500 µm, more preferably from 100 to 300 µm. The electrode layers 2 and 3 may be beforehand laminated onto the solid polymer electrolyte layer 1 so as to be integrated with each other by bonding, melt-bonding, painting or the like. However, these may be arranged to be merely laminated onto each other. The laminated body is available also as a membrane electrode assembly (MEA). This may be used.

In the invention, the external shapes of the first and second electrode layers 2 and 3 may be smaller than the external shape of the solid polymer electrolyte layer 1. Preferably, the external shapes of the first and second electrode layers 2 and 3 are each equal to the external shape of the solid polymer electrolyte layer 1. When the external shapes of the electrode layers are each equal to the external shape of the solid polymer electrolyte layer 1, a solid polymer electrolyte/electrode assembly can be produced by punching out a laminated body of the electrode plates and the solid polymer electrolyte. Costs of the assembly can be decreased by mass production effect. When the outer circumferences of the metallic layers are formed inside the outer circumferences of the electrode layers, the outer circumferences of the electrode layers and the outer circumference of the solid polymer electrolyte layer can be sealed with a higher certainty.

The first metallic layer 4 on the anode side is arranged on one of the surfaces of the anode side electrode layer 2, and the second metallic layer 5 on the cathode side is arranged on one of the surfaces of the cathode side electrode layer 3 (in the specification, it is supposed that the first metallic layer is on the anode side and the second metallic layer is on the cathode side). The first metallic layer 4 has the uncovering regions, which make the first electrode layer 2 partially uncovered. In the present embodiment, shown is an example wherein openings 4a for supplying a fuel gas and others are provided in the anode side metallic layer 4.

About the uncovering regions of the first metallic layer 4, the number, the shape and the size thereof, positions where the regions are formed, and others are not limited as far as the regions make it possible to make the anode side electrode layer 2 uncovered. About the openings 4a in the anode side metallic layer 4, for example, a plurality of circular holes, slits or the like may be made regularly or at random. Alternatively, it is allowable to make the openings 4a by use of a metallic mesh, or make the first metallic layer 4 in the form of a comb-shaped electrode to make the anode side electrode layer 2 uncovered. The percentage of the area of the openings 4a portions (opening percentage) is preferably from 10 to 50%, more preferably from 15 to 30% from the viewpoint of the balance between the contact area with the electrode and the gas-supplying area.

The second metallic layer 5 on the cathode side has the uncovering regions, which make the second electrode layer 3 partially uncovered. In the present embodiment, shown is an example wherein a large number of openings 5a for the supply of oxygen in the air (natural air intake) are made in the cathode side metallic layer 5. About the openings 5a, the number, the shape and the size thereof, positions where the openings are formed, and others are not limited as far as the openings make it possible to make the cathode side electrode layer 3 uncovered. About the openings 5a in the cathode side metallic layer 5, for example, a plurality of circular holes, slits or the like may be made regularly or at random. Alternatively, it is allowable to make the openings 5a by use of a metallic mesh, or make the second metallic layer 5 in the form of a comb-shaped electrode to make the cathode side electrode layer 3 uncovered. The percentage of the area of the openings 5a portions (opening percentage) is preferably from 10 to 50%, more preferably from 15 to 30% from the viewpoint of the balance between the contact area with the electrode and the gas-supplying area.

For the metallic layers 4 and 5, any metal may be used as far as the metal does not produce any bad effect onto the respective electrode reactions. Examples thereof include a stainless steel plate, nickel, copper, and copper alloys. Copper, copper alloys, and a stainless steel plate are preferred from the viewpoint of the electroconductivity, costs and shapability thereof, the strength thereof for pressuring, and others. The above-mentioned metals may each be subjected to metal plating, such as gold plating.

It is more effective for making the whole thinner to make the thickness of the metallic layers 4 and 5 smaller. Considering the electroconductivity, the costs, the shapability, the strength for pressuring, and others, the thickness is preferably from 10 to 1000 µm, more preferably from 50 to 200 µm.

In the invention, in order to integrate the electrode layers 2 and 3 satisfactorily with the metallic layers 4 and 5, respectively, through a resin, it is preferred that the outer circumference of the first metallic layer 4 is formed inside that of the first electrode layer 2, and it is preferred that the outer circumference of the second metallic layer 5 is formed inside that of the second electrode layer 3. The outer circumference of the first metallic layer 4 may be formed outside that of the first electrode layer 2, and the outer circumference of the second metallic layer 5 may be formed outside that of the second electrode layer 3.

At least one portion of each of the metallic layer 4 and the metallic layer 5 is uncovered with the resin, whereby the portion is used as an electrode so that electricity can be led out to the outside. Therefore, terminal regions where the metallic layers 4 and 5 are partially made uncovered may be located in the resin molded body 6; preferably, in the invention, the metallic layers 4 and 5 have projection regions 4b and 5b, respectively, which are to be electrodes of a unit cell, and the regions project from a resin molded body 6 to the outside. When the resin is insert-molded, the projection regions 4b and 5b may be used to hold the metallic layers 4 and 5 and so on (a lamination L) in a mold.

The formation of the metallic layers 4 and 5 and the making of the openings 5a and 4a may be attained by use of press working (press punching work). About each of the projection regions 4b and 5b of the metallic layers 4 and 5, a through hole may be made in its portion to be insert-molded in order to make the flow of the resin or the adhesive property thereof good. Furthermore, a through hole may be made in an uncovered portion of each of the projection regions 4b and 5b in order to make the connection and the fixation good.

As illustrated in FIG. 1, in the fuel cell of the invention, the individual layers 1 to 5, which have been described above, are integrated with each other through the resin molded body 6, which has been insert-molded. In the invention, it is preferred to cover the entire surfaces or substantially entire surfaces of the first electroconductive layer and/or the second electroconductive layer with the resin molded body 6. It is more preferred to cover the entire surfaces or substantially entire surfaces of the first electroconductive layer and the second electroconductive layer with the resin molded body 6. In this case, the resin molded body 6 may contain a partial preliminary molded body, as will be described later. The resin molded body 6 preferably has supplying regions for supplying a gas or liquid to the first and second electrode layers 2 and 3. The supplying regions are preferably openings 6a provided at its positions corresponding to the uncovering regions of the first metallic layer 4 or the second metallic layer 5.

In the present embodiment, shown is an example wherein the elements of the lamination L are integrated with each other through the resin molded body 6 in the state that the first and second metallic layers 4 and 5 are pressured from both the sides so as to make the first and second electrode layers 2 and 3 naked from the openings 6a.

In the invention, the size of the openings 4a and 5a, which correspond to the uncovering regions of the metallic layers 4 and 5, may be larger or smaller than that of the openings 6a in the resin molded body 6, or may be equal thereto. Preferably, the resin molded body 6 is in such a molded state that the size of the uncovering regions of the first metallic layer 4 and/or the second metallic layer 5 is substantially equal to that of the openings 6a. Specifically, the area of each of the openings 6a is preferably from 60 to 150% of that of each of the uncovering regions, more preferably from 80 to 130% thereof.

In the embodiment, shown is an example wherein the size of the openings 4a and 5a, which correspond to the uncovering regions of the metallic layers 4 and 5, is smaller than that of the openings 6a in the resin molded body 6. In this manner, the surroundings of the openings 4a and 5a in the metallic layers 4 and 5 can be pressured by use of their portions that correspond to the openings 6a in the resin molded body 6 at the time of the molding (see FIG. 2(c)).

The material of the resin molded body 6 may be a thermosetting resin, a thermoplastic resin, a heat-resistant resin or the like. A thermoplastic resin or thermosetting resin is preferred. Examples of the thermoplastic resin include polycarbonate resin, ABS resin, liquid crystal polymer, polypropylene, polystyrene, acrylic resin, fluorine-contained resin, polyester, and polyamide. Examples of the thermosetting resin include epoxy resin, unsaturated polyester resin, phenol resin, amino resin, polyurethane resin, silicone resin, and thermosetting polyimide resin. Of these resins, preferred are polyester, polypropylene and acrylic resin from the viewpoint of the fluidity of the resins in the mold, the strength and the melting temperature, and others. From these resins, the material is selected in accordance with the application.

It is allowable to use, for the resin molded body 6, a resin elastomer such as thermoplastic elastomer or rubber. In this case, the whole of the fuel cell can be made flexible by use of a flexible material as a material for the other portions thereof.

The thickness of the whole of the resin molded body 6 is preferably from 0.3 to 4 mm, more preferably from 0.5 to 2 mm from the viewpoint of the strength based on the integration through the resin, the pressure applied to the metallic layers, the thinning of the whole, and others. In particular, the thickness of the metallic-layer-covering region of the resin molded body 6 is preferably from 0.2 to 1.5 mm, more preferably from 0.3 to 1.0 mm from the viewpoint of the pressure applied to the metallic layers.

The area of the external shape of the resin molded body 6 is preferably from 101 to 200% of that of the external shape of the solid polymer electrolyte layer 1, more preferably from 150 to 180% thereof from the viewpoint of the strength based on the integration through the resin, and the pressure applied to the metallic layers.

In the fuel cell of the invention, a fuel and others are supplied thereto, and electric power can be generated as follows: For example, while the cell is made open to the atmosphere in the cathode side, the fuel, such as hydrogen gas, is supplied to a space located in the anode side, or the fuel, such as hydrogen gas, is generated in the space located in the anode side, thereby making it possible to generate electric power. It is allowable to fit one or more channel-forming members for forming one or more channels into the anode side and/or the cathode side, and supply an oxygen-containing gas or the fuel to the channel(s). The channel-forming member(s) may be (each), for example, a plate-form body wherein a channel groove, a supply port, and a discharge port are made, or a member having a structure similar to a separator of a stack type fuel cell. When the latter is used, a stack type fuel cell can be produced.

A fuel cell as described above may be manufactured by, for example, the manufacture method of the invention. Specifically, as illustrated in FIGS. 2(a) to (d), the method of the invention for manufacturing the fuel cell includes the step of arranging, into a mold 10, a lamination L composed of a solid polymer electrolyte layer 1, a first electroconductive layer and a second electroconductive layer arranged on each of both sides thereof, and a first metallic layer 4 and a second metallic layer 5 arranged outside the first and second electroconductive layers, respectively. In the present embodiment, shown is an example wherein the first electroconductive layer and the second electroconductive layer are a first metallic layer 4 and a second metallic layer 5, respectively, the layers 4 and 5 having uncovering regions (for example, openings 4a and 5a) for making the first electrode layer 2 and the second electrode layer 3, respectively, partially uncovered, and the uncovering regions are arranged in the mold 10 in the state that the regions are stuffed with convex portions 11a and 12a of the mold 10.

The fuel cell manufacturing method of the invention includes also a step of injecting a resin into the mold 10 to mold the resin into a resin molded body 6 for integrating the elements of the lamination L with each other. In the embodiment, shown is an example wherein a resin is injected into the mold 10 in the state that the first and second metallic layers 4 and 5 are pressured from both the sides, thereby molding the resin into the resin molded body 6, which has supplying regions for supplying a gas or liquid into the first and second electrode layers 2 and 3, and which causes the elements of the lamination L to be integrated with each other. In short, shown is an example wherein almost all portions of the lamination L, from which openings 6a that correspond to the supplying regions are excluded, are covered with the resin molded body 6.

As illustrated in, e.g., FIG. 2(a), prepared is first a lower mold part 11, which has, in the bottom surface thereof, the convex portions 11a. In the embodiment, shown is an example wherein: the mold 10 is made into divided structures; the convex portions 11a and 12a are located in inner surfaces of the divided mold members; and the convex portions 11a and 12a are brought into contact with the first and second metallic layers 4 and 5, respectively, under pressure. The convex portions 11a each have an upper surface having such a size that one of the openings 4a in the first metallic layer 4, which is at the lower side of a lamination L, can be stuffed with the convex portion. The convex portions 11a are located at positions opposed to the individual openings 4a. The lower mold part 11 has side walls around the bottom surface, and an upper mold part 12 can be inserted along the inner surfaces of the side walls.

One port 11b for injecting a resin is made in the lower mold part 11 (or the upper mold part 12); however, a plurality of injecting ports 11b may be made. In order to make the flow of the resin good at the time of molding the resin, one or more small ports for discharging the resin may be made.

Furthermore, the side walls of the lower mold part 11 are made into divided structures (not illustrated) in order to make projection regions 4b and 5b of the first and second metallic layers 4 and 5 naked from the resin molded body 6 after the resin is molded into the body 6. When the lamination L is arranged inside the mold 10, the projection regions 4b and 5b of the first and second metallic layers 4 and 5 are positioned at rectangular notches each located in one of the side walls of the lower mold part 11. The mold has a structure wherein the projection regions 4b and 5b are pushed by the mold parts. In this manner, the projection regions 4b and 5b can be made naked from the resin molded body 6.

As illustrated in, e.g., FIG. 2(b), next, the lamination L is arranged on the bottom surface of the lower mold part 11. At this time, the arrangement is attained in such a manner that the openings 4a in the first metallic layer 4 can be stuffed with the upper surfaces of the convex portions 11a of the bottom surface. When the lamination L is arranged, the individual layers may or may not be partially or wholly integrated with each other. When the layers are not partially integrated with each other, the individual layers may be separately or simultaneously arranged. The structure of the arranged lamination L is as described above. At the time of the arrangement, it is allowable to use a preliminary molded body wherein a final shape of the resin molded body 6 is partially completed in advance, and arrange this preliminary molded body together with the lamination L in the mold 10 (see, for example, FIG. 4).

As illustrated in, e.g., FIG. 2(c), the upper mold part 12 is inserted, along the inner surfaces of the side walls of the lower mold part 11, thereinto. The convex portions 12a are located in the lower surface of the upper mold part 12. The convex portions 12a each have an upper surface having such a size that one of the openings 5a in the second metallic layer 5, which is at the upper side of the lamination L, can be stuffed with the convex portion. The convex portions 12a are located at positions opposed to the individual openings 5a. The lamination L is arranged inside the mold 10 in the state that the metallic layers 4 and 5 are pressured between the convex portions 11a of the lower mold part 11 and the convex portions 12a of the upper mold part 12. At this time, the projection regions 4b and 5b of the first and second metallic layers 4 and 5 may be arranged from the inner space of the mold 10 to the outside.

In the state, a resin (the "resin" may be a raw material liquid of a resin or an uncured product thereof) is injected into the mold 10. As illustrated in FIG. 2(d), however, in the resultant molded body, the first and second electrode layers 2 and 3 are made naked from the openings 6a since the uncovering regions (for example, the openings 4a and 5a) are stuffed with the convex portions 11a and the convex portions 12a. Additionally, the injection of the resin makes it possible to integrate the solid polymer electrolyte layer 1, the electrode layers 2 and 3 and the first and second metallic layers 4 and 5 with each other by insert molding.

Second Embodiment

Figure 8:
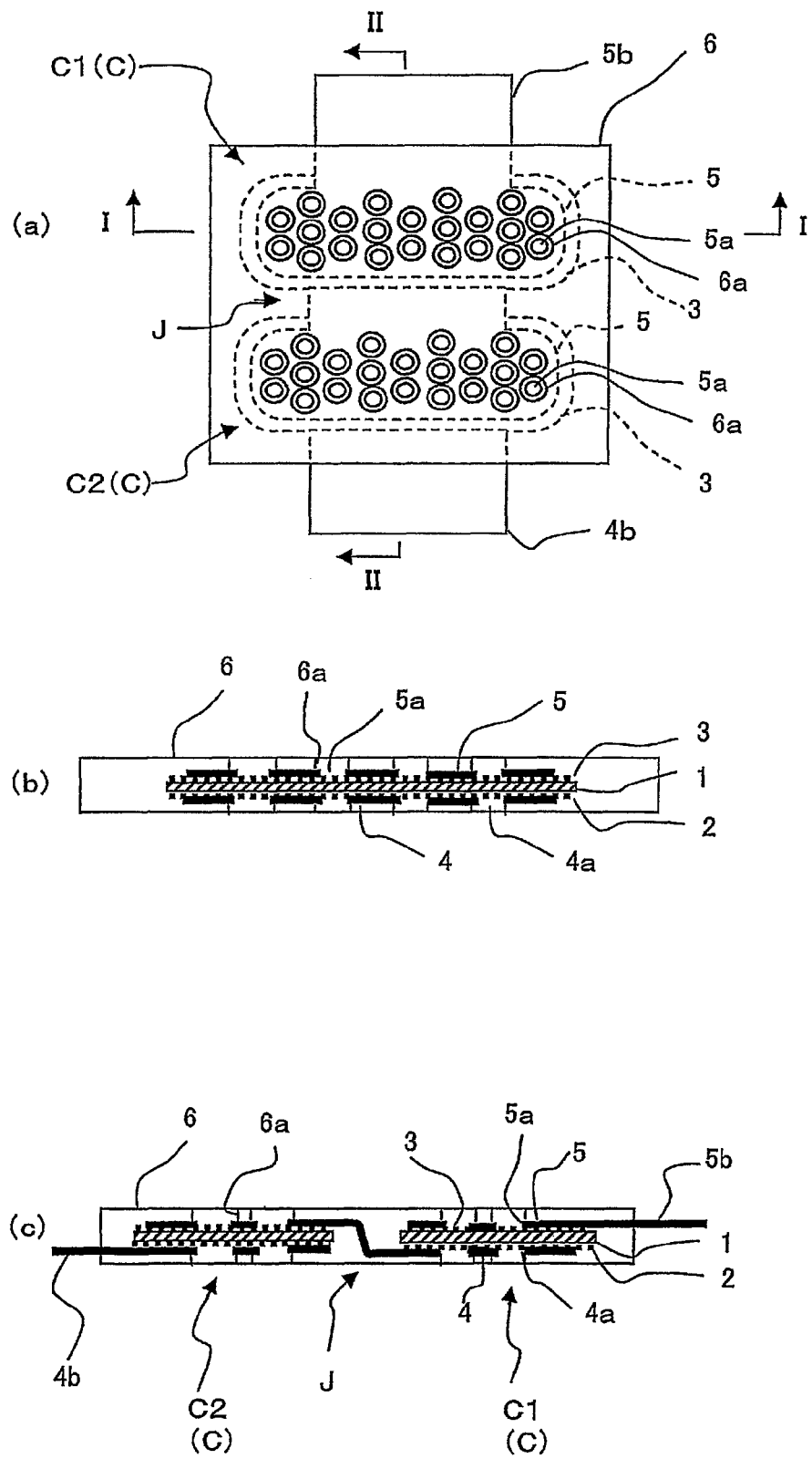
FIG. 8 The figures are views illustrating another embodiment of the fuel cell of the invention.

Referring to the drawings, another embodiment of the fuel cell according to the invention will be described. FIG. 8 is views illustrating an example of the fuel cell of the invention, and FIGS. 8(a), 8(b) and 8(c) are a top view thereof, a sectional thereof which is viewed in the direction of arrows I-I, and a sectional thereof which is viewed in the direction of arrows II-II, respectively.

As illustrated in FIG. 8, the fuel cell of the invention has unit cells C, and an electroconductive layer of any one C1 of the unit cells is electrically connected to an electroconductive layer of another cell C2 of the unit cells through a joint region. In this embodiment, shown is an example wherein a first electroconductive layer (first metallic layer 4) of the unit cell C1 is electrically connected (in series) to a second electroconductive layer (second metallic layer 5) of the unit cell C2. In the invention, the unit cell C1 may be connected in parallel to the other unit cell C2. In this case, first electroconductive layers of the unit cells C1 and C2, as well as second electroconductive layers of the unit cells C1 and C2, may be electrically connected to each other. Of course, such a connection in parallel may be combined with such a connection in series.

The number of the unit cells C to be connected to each other may be set in accordance with a required voltage or current. In this embodiment, shown is an example wherein two unit cells C are connected to each other.

Each of the unit cells C in the invention has a solid polymer electrolyte 1, a first electrode layer 2 and a second electrode layer 3 laid on each of both sides of the solid polymer electrolyte layer 1, and a first electroconductive layer and a second electroconductive layer arranged outside the electrode layers 2 and 3, respectively. In the present embodiment, shown is an example wherein the first electroconductive layer and the second electroconductive layers are made of a first metallic layer 4 and a second metallic layer 5, respectively, the layers 4 and 5 having uncovering regions for making respective portions of the first electrode layer 2 and the second electrode layer 3 partially uncovered. Parts or regions different from those in the first embodiment will be described hereinafter. The other parts or regions are the same as in the first embodiment.

As illustrated in FIG. 8, the fuel cell of the invention has a joint region J for connecting one or two electroconductive layers of any one of the unit cells C electrically to one or two electroconductive layers of another of the unit cells C. When they are connected to each other in series, the first electroconductive layer of any one of the unit cells C is electrically connected to the second electroconductive layer of another of the unit cells C. In this embodiment, shown is an example wherein the first electroconductive layer (metallic layer 4) of one of the unit cells C adjacent to each other, the second electroconductive layer (metallic layer 5) of the other, and the joint region J are constituted by a metallic layer made of a continuous metallic plate.

In this embodiment, the joint region J is in the form of a rectangle having, in the center thereof, a step region. However, the shape of the joint region J may be any shape. The joint region J may be in such a form that this region partially projects to the outside of a molded body 6 of a resin. When the resin is insert-molded, it is necessary to position and fix laminations into a mold; at the time of the positioning and fixing, it is preferred that the joint region J is in such a form that the joint region J partially projects to the outside of the resin molded body 6.

The joint region J is a region for connecting the adjacent unit cells to each other in series, and is a metallic plate integrated with the first and second metallic layers 4 and 5. When this metallic plate is used instead of independent arrangements of the first and second metallic layers 4 and 5, a fuel cell wherein the unit cells C are connected to each other in series can be manufactured only by arranging this plate inside a mold.

As illustrated in FIG. 8(c), the metallic plate is a plate wherein the first and second metallic layers 4 and 5, which are arranged in planes parallel to each other so as to be adjacently to each other, are each extended outside in the same plane, and are jointed to each other through the step region so as to be integrated with each other. The step region may be produced by subjecting a metallic plate to sheet metal working.

As illustrated in FIG. 8, the fuel cell of the invention has the resin molded body 6, wherein the above-mentioned unit cells C and joint region J are integrated with each other by insert molding. The resin molded body 6 preferably has supplying regions for supplying a gas or liquid to the first and second electrode layers 2 and 3, and the supplying regions are preferably openings 6a provided at its positions corresponding to covering regions of the first or second metallic layer 4 or 5.

A fuel cell as described above may be manufactured by, for example, the manufacturing method of the invention. Specifically, as illustrated in FIGS. 2(a) to (d), the method of the invention for manufacturing the fuel cell includes a step of arranging, into a mold 10, laminations L each composed of a solid polymer electrolyte layer 1, a first electrode layer 2 and a second electrode layer 3 arranged on each of both sides thereof, and a first electroconductive layer and a second electroconductive layer arranged outside the first and second electrode layers, respectively, in the state that one or two of the electroconductive layers of any one of the laminations L are electrically connected to one or two of those of another of the laminations L through a joint region or joint regions J. When the laminations L are connected to each other in series, the first electroconductive layer of one of any adjacent two of the laminations L is connected to the second electroconductive layer of the other. When the laminations L are connected to each other in parallel, the first electroconductive layer of one of any adjacent two of the laminations L is connected to the first electroconductive layer of the other and further the second electroconductive layer of one of the two laminations L is connected to the second electroconductive layer of the other.

In this embodiment, shown is an example wherein the first electroconductive layers and the second electroconductive layers are first metallic layers 4 and second metallic layers 5, respectively, the layers 4 and 5 having uncovering regions (for example, openings 4a and 5a) for making the first electrode layers 2 and the second electrode layers 3, respectively, partially uncovered, and the uncovering regions are arranged in the mold 10 in the state that the regions are stuffed with convex portions 11a and 12a of the mold 10.

The laminations L, which each constitute a unit cell C, may be arranged in parallel in the same plane. The laminations L may be arranged on two sides of an L-shape, on two to four sides of a square or rectangle, on two or three sides of a triangle, or on some other sides. In this embodiment, shown is an example wherein the two laminations L are arranged in parallel in the same plane.

The fuel cell manufacturing method of the invention includes also a step of injecting a resin into the mold 10 to mold the resin into a resin molded body 6 for integrating the laminations L with the joint region(s) J. In this embodiment, shown is an example wherein a resin is injected into the mold 10 in the state that the first and second metallic layers 4 and 5 are pressured from both the sides, thereby molding the resin into the resin molded body 6, which has supplying regions for supplying a gas or liquid into the first and second electrode layers 2 and 3, and which causes the laminations L to be integrated with each other. In short, shown is an example wherein almost all portions of the laminations L, from which openings 6a that correspond to the supplying regions are excluded, are covered with the resin molded body 6.

As illustrated in, e.g., FIG. 2(a), prepared is first a lower mold part 11 having, in the bottom surfaces of its regions where the respective unit cells C are to be formed, convex portions 11a. In the embodiment, shown is an example wherein: the mold 10 is made into divided structures; the convex portions 11a and convex portions 12a are located in inner surfaces of the divided mold members, respectively; and the convex portions 11a and 12a are brought into contact with the first and second metallic layers 4 and 5, respectively, under pressure. The convex portions 11a each have an upper surface having such a size that one of the openings 4a in the first metallic layers 4, which are at the lower sides of the laminations L, can be stuffed with the convex portion 11a. The convex portions 11a are located at positions opposed to the individual openings 4a. The lower mold part 11 has side walls around the bottom surface, and an upper mold part 12 can be inserted along the inner surfaces of the side walls.

One port 11b for injecting a resin is made in the lower mold part 11 (or the upper mold part 12); however, a plurality of injecting ports 11b may be made. In order to make the flow of the resin good at the time of molding the resin, one or more small ports for discharging the resin may be made.

Furthermore, the side walls of the lower mold part 11 are made into divided structures (not illustrated) in order to make projection regions 4b and 5b of the first and second metallic layers 4 and 5 naked from the resin molded body 6 after the resin is molded into the body 6. When the laminations L are arranged inside the mold 10, the projection regions 4b and 5b of the first and second metallic layers 4 and 5 are positioned at rectangular notches each located in one of the side walls of the lower mold part 11. The mold has a structure wherein the projection regions 4b and 5b are pushed by the mold parts. In this manner, the projection regions 4b and 5b can be made naked from the resin molded body 6.

As illustrated in, e.g., FIG. 2(b), next, the laminations L are arranged on the bottom surface of the lower mold part 11. At this time, the arrangement is attained in such a manner that the openings 4a in the first metallic layer 4 of each of the laminations L can be stuffed with the upper surfaces of the convex portions 11a made in the bottom surface of the region where each of the unit cells C is to be formed.

In the invention, the laminations L are arranged inside the mold 10 in the state that the first electroconductive layer of one of any adjacent two of the laminations L is electrically connected to the second electroconductive layer of the other through one of the joint regions J. In this embodiment, shown is an example wherein the first electroconductive layer (metallic layer 4) of one of the two adjacent laminations L, the second electroconductive layer (metallic layer 5) of the other, and the joint region J are constituted by a metallic layer made of a continuous metallic plate.

When the laminations L are each arranged, its individual layers may or may not be partially or wholly integrated with each other. When the layers are not partially integrated with each other, the individual layers may be separately or simultaneously arranged. The structures of the arranged laminations L are each as described above. At the time of the arrangement, it is allowable to use a preliminary molded body wherein a final shape of the resin molded body 6 is partially completed in advance, and arrange this preliminary molded body together with the laminations L in the mold 10 (see, for example, FIG. 4).

Next, as illustrated in, e.g., FIG. 2(c), the upper mold part 12 is inserted, along the inner surfaces of the side walls of the lower mold part 11, thereinto. The convex portions 12a are located in the lower surfaces of upper mold part 12 regions where the respective unit cells C are to be formed. The convex portions 12a each have an upper surface having such a size that one of the openings 5a in the second metallic layer 5 which is at the upper side of each of the laminations L can be stuffed with the convex portion 12a. The convex portions 12a are located at positions opposed to the individual openings 5a. The laminations L are arranged inside the mold 10 in the state that the metallic layers 4 and 5 are pressured between the convex portions 11a of the lower mold part 11 and the convex portions 12a of the upper mold part 12. At this time, the projection regions 4b and 5b of the first and second metallic layers 4 and 5 may be arranged from the inner space of the mold 10 to the outside.

In the state, a resin (the "resin" may be a raw material liquid of a resin or an uncured product thereof) is injected into the mold 10. As illustrated in FIG. 2(d), however, in the resultant molded body, the first and second electrode layers 2 and 3 are made naked from the openings 6a since the uncovering regions (for example, the openings 4a and 5a) are stuffed with the convex portions 11a and the convex portions 12a. Additionally, the injection of the resin makes it possible to integrate the laminations L, which each contain the solid polymer electrolyte layer 1, the electrode layers 2 and 3 and the first and second metallic layers 4 and 5, with each other by insert molding.

In this embodiment, shown has been an example wherein the first electroconductive layer of one of any adjacent two of the unit cells, the second electroconductive layer of the other, and the joint region are constituted by the metallic layer made of the continuous metallic plate. However, any joint region in the invention may be any member or portion capable of connecting the first electroconductive layer of the one electrically to the second electroconductive layer of the other.

For example, the first electroconductive layer of one of the unit cells may be electrically connected to the second electroconductive layer of another of the cells through a different member. For example, a metal wire or the like may be used to perform solder connection. A member which constitutes (each of) the joint region(s) may be electrically connected to the electroconductive layers by mechanical contact therebetween. The first electroconductive layer of one of the cells and the second electroconductive layer of another of the cells may be electrically connected to each other, for example, by using a metallic plate or the like, bringing the plate or the like into contact with the electroconductive layers and further integrating them with each other through a resin molded body.

In this embodiment, shown has been an example wherein the plural unit cells are arranged in the same plane. However, the individual unit cells may be three-dimensionally arranged. For example, the individual unit cells may be arranged on two sides of an L-shape, on two to four sides of a square or rectangle, on two or three sides of a triangle, or on some other sides.

When the individual unit cells are three-dimensionally arranged in this way, a method therefor is classified into a method of forming the cells three-dimensionally in insert molding, or a method of using a flexible material to form the cells two-dimensionally in insert molding, and then deforming the resultant three-dimensionally.

In the former case, it is preferred that a metallic plate wherein the first electroconductive layer of one of any adjacent two of the individual unit cells, the second electroconductive layer of the other, and a joint region are continuous with each other is bent in accordance with the angle between the adjacent unit cells. In the case of arranging unit cells, for example, on four sides of a square (square pole), the metallic plate is bent at an angle of about 90°.

This metallic plate is used to arrange laminations which each constitute a unit cell inside a mold 10 having a cavity in the form of a square pole, so as to be each located on its four sides, thereby connecting the individual cells electrically to each other. In this state, insert molding is performed. This method makes it possible to manufacture a fuel cell wherein the respective unit cells are arranged on the four sides of the square pole.

Figure 3:
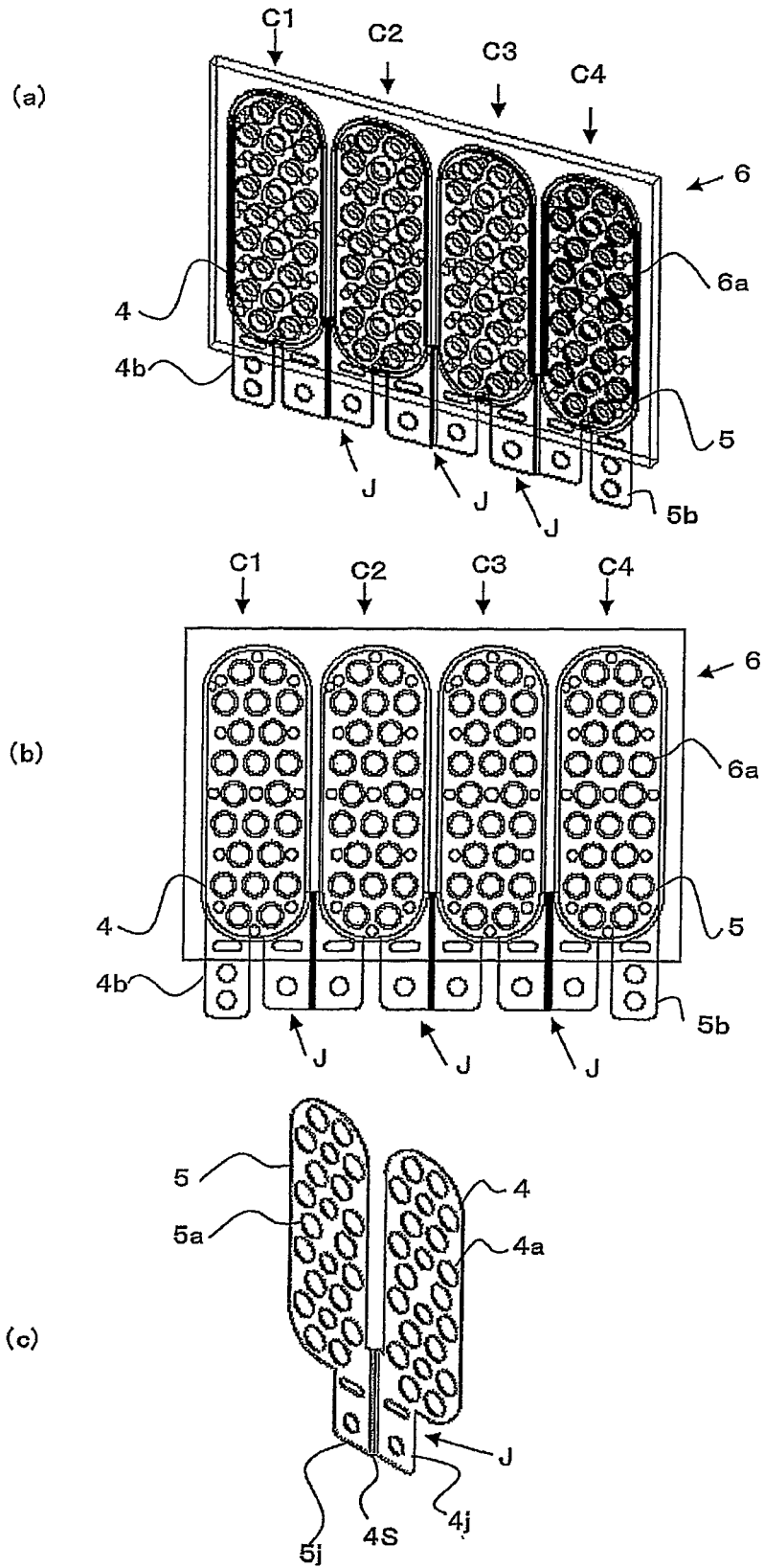
FIG. 3 The figures are views illustrating another example of the fuel cell of the invention, and FIGS. 3(a), (b) and (c) are a perspective view thereof, a top view thereof, and a perspective view of a main portion thereof, respectively.

Other Embodiments (1) In the second embodiment, shown has been an example wherein the resin molded body contains therein two unit cells and the joint region does not project to the outside of the resin molded body. In the invention, however, a resin molded body may contain therein three or more unit cells as illustrated in FIGS. 3(*a*) to 3(*c*). In this embodiment, shown is an example wherein four unit cells C1 to C4 are connected to each other by use of a metallic plate which partially projects to the outside of a resin molded body, this plate being a plate wherein first metallic layers 4, second metallic layers 5 and joint regions J are continuous with each other.

Although the structure of each of the unit cells C1 to C4 is basically as described above, the following are different from the above: projecting regions 4b and 5b of metallic layers, and a metallic plate through which first and second metallic layers 4 and 5 are integrated with each other. In this embodiment, the unit cells C1 to C4 are connected to each other in series; thus, the projection regions 4b and 5b of the metallic layers are located only in the unit cells C1 and C4, respectively. In other words, this embodiment has only the projection region 4b of the first metallic layer 4 of the unit cell C1, and the projection region 5b of the second metallic layer 5 of the unit cell C4. About the projection regions 4b and 5b of the metallic layers, the necessity thereof, the shapes thereof, and others are described above.

The metallic plate, wherein any one of the first metallic layers 4 is integrated with the corresponding second metallic layer 5 through a joint region J, is a member for connecting any adjacent two of the unit cells C to each other in series. When this metallic plate is used instead of independent arrangements of the first and second metallic layers 4 and 5, a fuel cell wherein the unit cells C1 to C4 are connected to each other in series can be manufactured only by arranging this plate inside a mold 10.

As illustrated in FIG. 3(*c*), the metallic plate has extended regions 4j and 5j, where any one of the first metallic layers 4 and the corresponding second metallic layer 5 that are arranged in planes parallel to each other so as to be adjacent to each other are extended outside in the same planes. The extended regions 4j and 5j are jointed to each other through a step region 4s so as to be integrated with each other. This step region may be produced by subjecting a metallic plate to sheet metal working. When the cell units are connected to each other in parallel, for example, use may be made of a metallic plate wherein the first metallic layers 4 (or the second metallic layers 5) arranged in the same plane so as to be adjacent to each other are connected to each other through an extended portion extended therefrom, so as to be integrated with each other.

Figure 4:
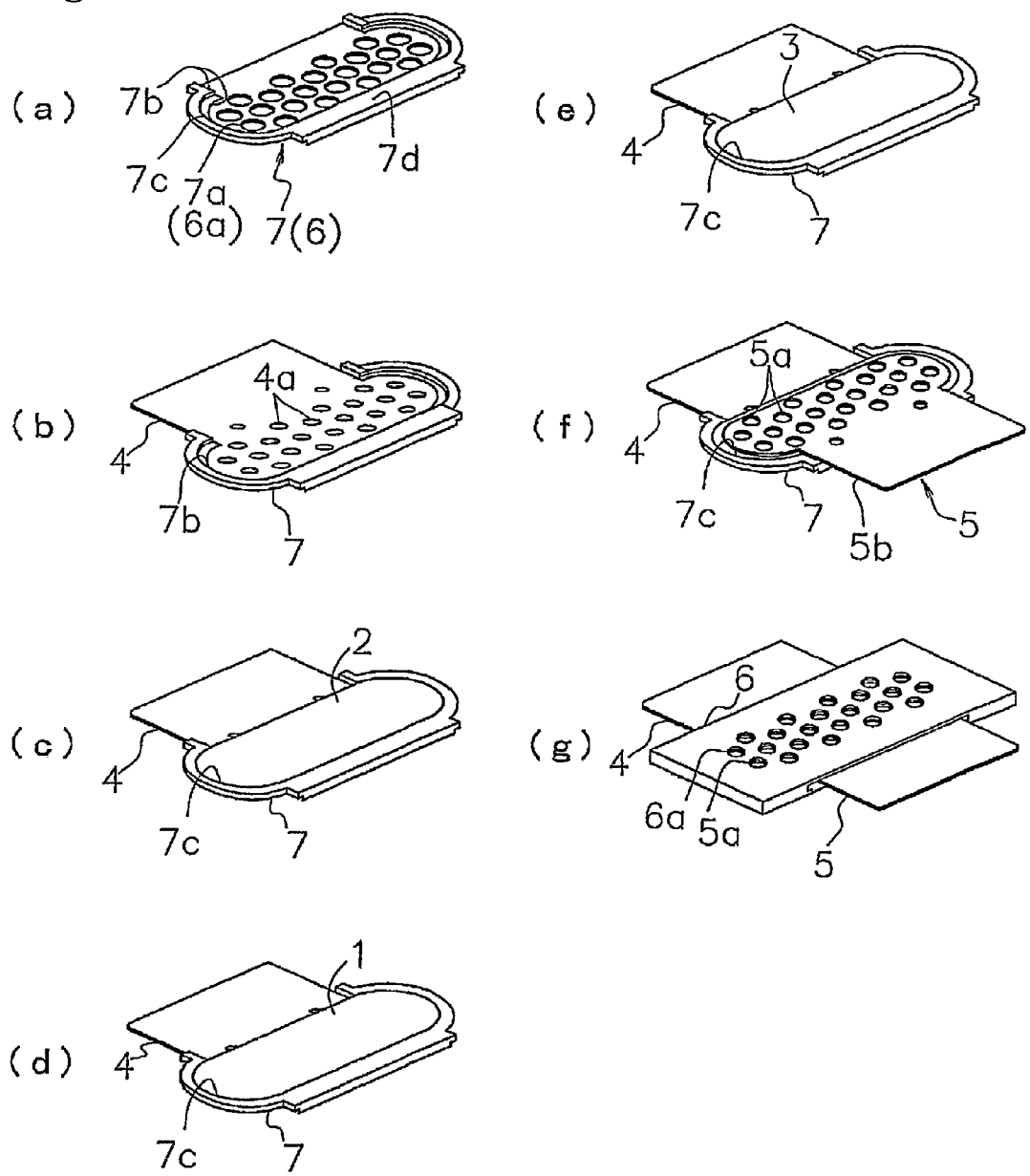
FIG. 4 The figures are perspective views illustrating another example of the fuel cell manufacturing method of the invention.

(2) In the above-mentioned embodiments, shown have been examples wherein openings are made in convex portions of upper and lower mold parts without using any preliminary molded body. However, as illustrated in FIG. 4, in the invention, openings 6a may be made by convex portions 12a of only one mold part 12 of a mold, using a preliminary molded body 7 wherein the openings 6a are beforehand made. By the use of the preliminary molded body 7, a lamination L can easily be positioned at the time of arranging the lamination L in the mold 10 and further the openings 6a can easily be made in the resin molded body 6. When the preliminary molded body 7 is used, one of the metallic layers is pressured while the other metallic layer is pressured by the convex portions of the mold.

As illustrated in FIG. 4(*a*), the preliminary molded body 7 is beforehand molded. The preliminary molded body 7 has openings 7a corresponding to the openings 6a in the resin molded body 6. In other words, the openings 7a are maintained at a subsequent resin molding. The external shape of the preliminary molded body 7 is not particularly limited. It is advisable that the shape is smaller than the resin molded body 6, which is a body (obtained) after the resin is insert-molded, and is somewhat larger than a solid polymer electrolyte layer 1.

The preliminary molded body 7 preferably has a step region 7b for positioning a first metallic layer 4 or a step region 7c for positioning electrode layers 2 and 3 and the solid polymer electrolyte layer 1. The preliminary molded body 7 preferably has a supporting region 7d for supporting the projection region 5b of the second metallic layer 5.

As illustrated in FIG. 4(*b*), next, the preliminary molded body 7 is arranged in a mold (not illustrated) and further the first metallic layer 4 is positioned and arranged along the step region 7b. At this time, the positions of the openings 4a in the first metallic layer 4 are substantially consistent with those of the openings 7a in the preliminary molded body 7.

As illustrated in FIGS. 4(*c*) to 4(*e*), next, the first electrode layer 2, the solid polymer electrolyte layer 1 and the second electrode layer 3 are successively positioned and arranged along the step region 7c of the preliminary molded body 7. At this time, a product wherein these are beforehand laminated/integrated on/with each other may be positioned and arranged. At the time, by giving a margin to the size of the step region 7c, the outer circumferences of the electrode layers 2 and 3 and the outer circumference of the solid polymer electrolyte layer 1 can be sealed up at a subsequent resin-injection.

As illustrated in FIG. 4(*f*), next, the second metallic layer 5 is laminated and arranged thereon. At this time, the projection region 5b of the second metallic layer 5 is supported by the supporting region 7d, and further the openings 5a in the second metallic layer 5 are arranged in such a manner that the positions thereof are substantially consistent with those of the convex portions 12a located in the lower surface of the upper mold part 12.

As illustrated in FIG. 4(*g*), next, a resin is injected into the set mold to form a fuel cell wherein the preliminary molded body 7 is integrated with the resin molded body 6. At this time, the openings 5a are stuffed with the convex portions 12a and further the openings 7a in the preliminary molded body 7 are not stuffed with any resin; thus, in the resultant molded body, the first and second electrode layers 2 and 3 are naked from the openings 6a. Since one 4 of the metallic layers is pressured by the preliminary molded body 7 and the other metallic layer 5 is pressured by the convex portions 12a of the mold 10, the resultant has a structure wherein the elements of the lamination are integrated with each other through the resin molded body 6 in the state that the first and second metallic layers 4 and 5 are pressured from both the side.

Figure 5:
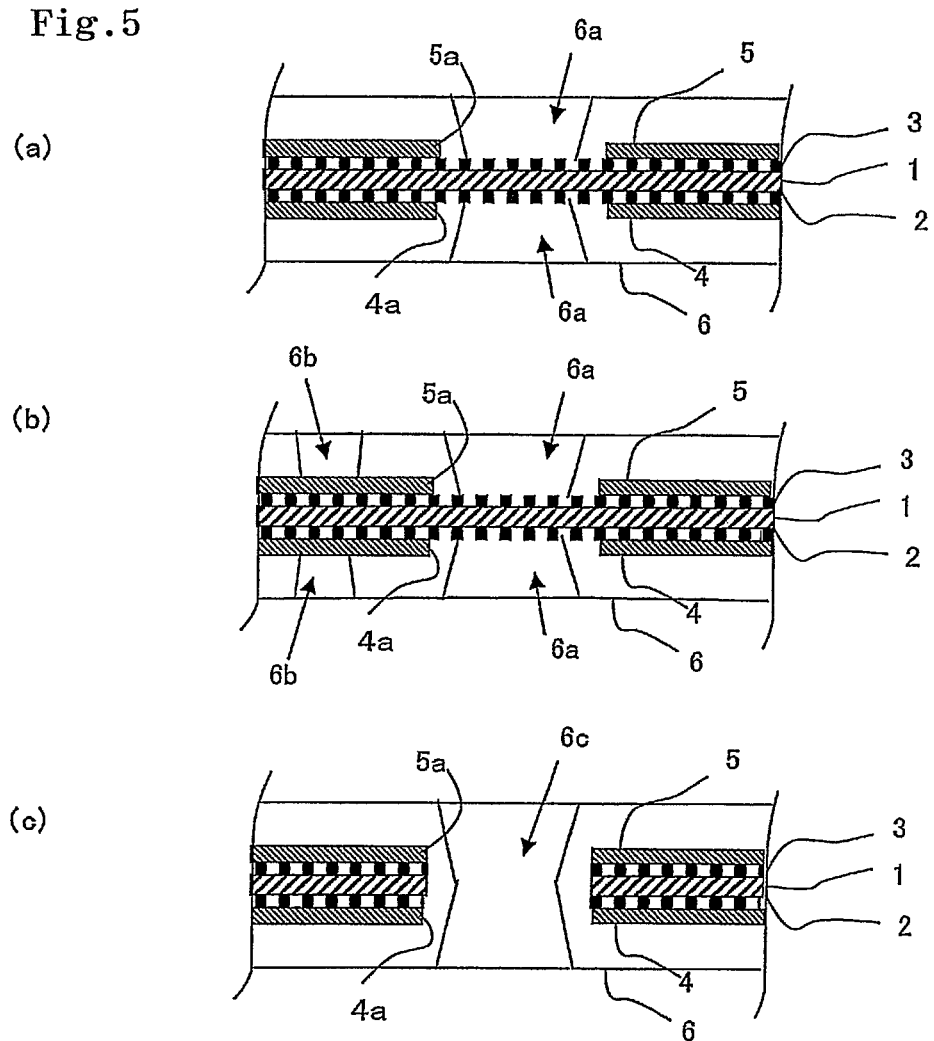
FIG. 5 The figures are sectional front views illustrating a different example of the fuel cell of the invention.

(3) In the above-mentioned embodiments, shown have been examples wherein the size of openings corresponding to uncovering regions of any metallic layer is smaller than that of openings in the resin. As illustrated in FIG. 5(a), however, the size of each of openings 6a in a molded body 6 of a resin may be made smaller than that of the size of each of openings 4a and 5a in metallic layers 4 and 5. In this case, electrode layers 2 and 3 naked from the openings 4a and 5a, respectively, are partially sealed with the resin molded body 6, so that bonding force between the resin molded body 6 and the electrode layers 2 and 3 can make adhesive properties high between the electrode layers 2 and 3 and the metallic layers 4 and 5, respectively. In order to make the size of the openings 6a in the resin molded body 6 smaller than that of the openings 4a and 5a, it is advisable to use a mold having convex portions formed to make the size of their upper surfaces smaller than that of the openings 4a and 5a, and seal the lamination with the resin in the state that the convex portions contact the electrode layers 2 and 3.

In this case, the surroundings of the openings 4a and 5a in the metallic layers 4 and 5 cannot be pressured by use of their regions corresponding to the openings 6a in the resin molded body 6 when the resin is molded. As illustrated in FIG. 5(b), therefore, regions of the metallic layers 4 and 5 from which the openings 4a and 5a are excluded are pressured with, for example, different pins at the time of the molding. This manner makes it possible to integrate the elements of the lamination with the resin molded body 6 in the state that the first and second metallic layers 4 and 5 are pressured from both the sides. When the pressuring is performed, openings 6b for pressuring are made in the regions pressured against the pins or the like.

As illustrated in FIG. 5(c), through holes 6c contributing to no power generation may be further made in the resin molded body 6. In connection with the through holes 6c, through holes are made in the solid polymer electrolyte layer 1, the electrode layers 2 and 3 and the others, the through holes 6c smaller than the through holes are made, and the electrode layers 2 and 3 and the others are integrated with each other through the resin molded body 6 around the through holes 6c. According to the through holes 6c, the resin molded body 6 around the holes 6c causes the integration of the solid polymer electrolyte layer 1, the electrode layers 2 and 3, and the metallic layers 4 and 5. Therefore, respective pressured-contact forces between the electrode layers 2 and 3 and the metallic layers 4 and 5 can be made high.

The through holes 6c, which contribute to no power generation, are made together with the uncovering regions of the electrode layers 2 and 3 for power generation. In a case where the regions other than the through holes 6c are pressured by use of, for example, different pins or the like at the time of the molding, the elements of the lamination can be integrated with each other through the resin molded body 6 in the state that the first and the second metallic layers 4 and 5 are pressured from both the sides. In the case also, openings 6b for pressuring are formed in the region pressured against the pins or the like.

(4) In the above-mentioned embodiments, examples of a hydrogen-supplying type fuel cell have been mainly shown. However, the fuel cell usable in the invention may be any fuel cell that can generate power by use of a fuel. Examples thereof include methanol-modified type, direct methanol type, and hydrocarbon supplying type fuel cells. Known are also various fuel cells each using some other fuel. Any one of these cells may be adopted.

In this case, a solid polymer electrolyte layer, electrode layers and others are used in accordance with any one of the various fuel cells. In the case of, for example, a direct methanol type fuel cell, a large crossover is generally caused according to a NAFION type; in order to restrain this, it is preferred to use an aromatic hydrocarbon based solid polymer electrolyte. It is also preferred to use, as a catalyst, a two-species-mixed catalyst (Pt and Ru) in the electrode layers.

(5) In the above-mentioned embodiments, shown have been examples wherein elements of any lamination are integrated with each other through a resin molded body so as to make the size of uncovering regions of any first metallic layer and/or any second metallic layer substantially equal to the size of openings. As illustrated in FIGS. 7(a) to 7(d), however, in the invention, a single large opening 6a may be made in a single surface (of a resin molded body 6), thereby making uncovering regions of a first metallic layer 4 and/or a second metallic layer 5 wholly or partially uncovered.

Moreover, two or more large openings 6a may be made in a single surface (of a resin molded body 6), thereby making ½ or less of uncovering regions of a first metallic layer 4 and/or a second metallic layer 5 uncovered. In short, in the invention, a resin may be molded to make two or more uncovering regions naked from an opening 6a or each opening 6a.

(6) In the above-mentioned embodiments, shown have been examples wherein any first electroconductive layer and any second electroconductive layer are a first metallic layer and a second metallic layer, respectively, that have uncovering regions for making a first electrode layer and a second electrode layer, respectively, partially uncovered. In the invention, however, one or more electroconductive layers having no uncovering region may be used as a first electroconductive layer and/or a second electroconductive layer. In this case, one or more electroconductive layers having gas permeability or gas diffusibility may be used. Examples of the electroconductive layer(s) include porous metallic layers, porous electroconductive polymeric layers, electroconductive rubbery layers, electroconductive fibrous layers, electroconductive pastes, and electroconductive paints.

(7) In the above-mentioned embodiments, shown have been examples wherein any first electrode layer and any second electrode layer are made naked from openings in a resin molded body. In the invention, however, a porous layer may be interposed between any opening in a resin molded body and a first electrode layer or second electrode layer. In order to interpose the porous layer, it is advisable to lay the porous layer beforehand outside a metallic layer or electroconductive layer in a lamination to be used for insert molding. The porous layer and the metallic layer or electroconductive layer may be beforehand bonded to each other, or may be arranged to be merely laminated onto each other.

Examples of the material for forming the porous layer include a porous membrane, unwoven cloth, and woven cloth that can each resist the temperature when a resin is insert-molded.

(8) In the above-mentioned embodiments, shown have been examples wherein openings for exposing any first electrode layer and any second electrode layer to the outside are made in a resin molded body. In the invention, however, channels for supplying a gas or liquid may be made inside a resin molded body. In this case, an insert molding as described above is performed, using a preliminary molded body having, in its inner surfaces which are to contact electroconductive layers, the channels. In this way, the resultant electrode layers can be exposed to the channels.

EXAMPLES

Hereinafter, a description will be made about examples demonstrating the structure and advantageous effects of the invention specifically, and others.

Example 1

A copper plate 0.2 mm in thickness was pressed to be punched out into shapes as illustrated in FIG. 1 (being each a small oval having a long diameter of 31 mm and a short diameter of 10 mm, and having projection regions each having 22 openings each having a diameter of 2.0 mm). In this way, two copper plates, which were each to be metallic layers, were formed.

A thin-film electrode assembly (33 mm×12 mm) shown in FIG. 1 was formed as follows: As a platinum catalyst, use was made of a 20% platinum-carried carbon catalyst (EC-20-PTC) manufactured by ElectroChem, Inc. This platinum catalyst, carbon black (Ketjenblack EC manufactured by Akzo) and polyvinylidene fluoride (KYNAR) were mixed with each other to give proportions of 75% by weight, 15% by weight and 10% by weight. Dimethylformamide was added to the mixture of the platinum catalyst, the carbon black, and the polyvinylidene fluoride to give a 2.5% by weight solution of polyvinylidene fluoride. The components were mixed with each other in a mortar to dissolve the solid components. In this way, a catalyst paste was produced. A carbon paper piece (TGP-H-90, manufactured by Toray Industries, Inc.; thickness: 370 µm) was cut into a size of 33 mm×12 mm, and then about 20 mg of the catalyst paste produced as described above was applied onto the cut piece with a spatula. The resultant was dried in a hot-wind-circulating dryer of 80° C. In this way, a carbon paper piece on which 4 mg of the catalyst composition was carried was produced. The carried platinum amount was 0.6 mg/cm$^2$.

Figure 2:
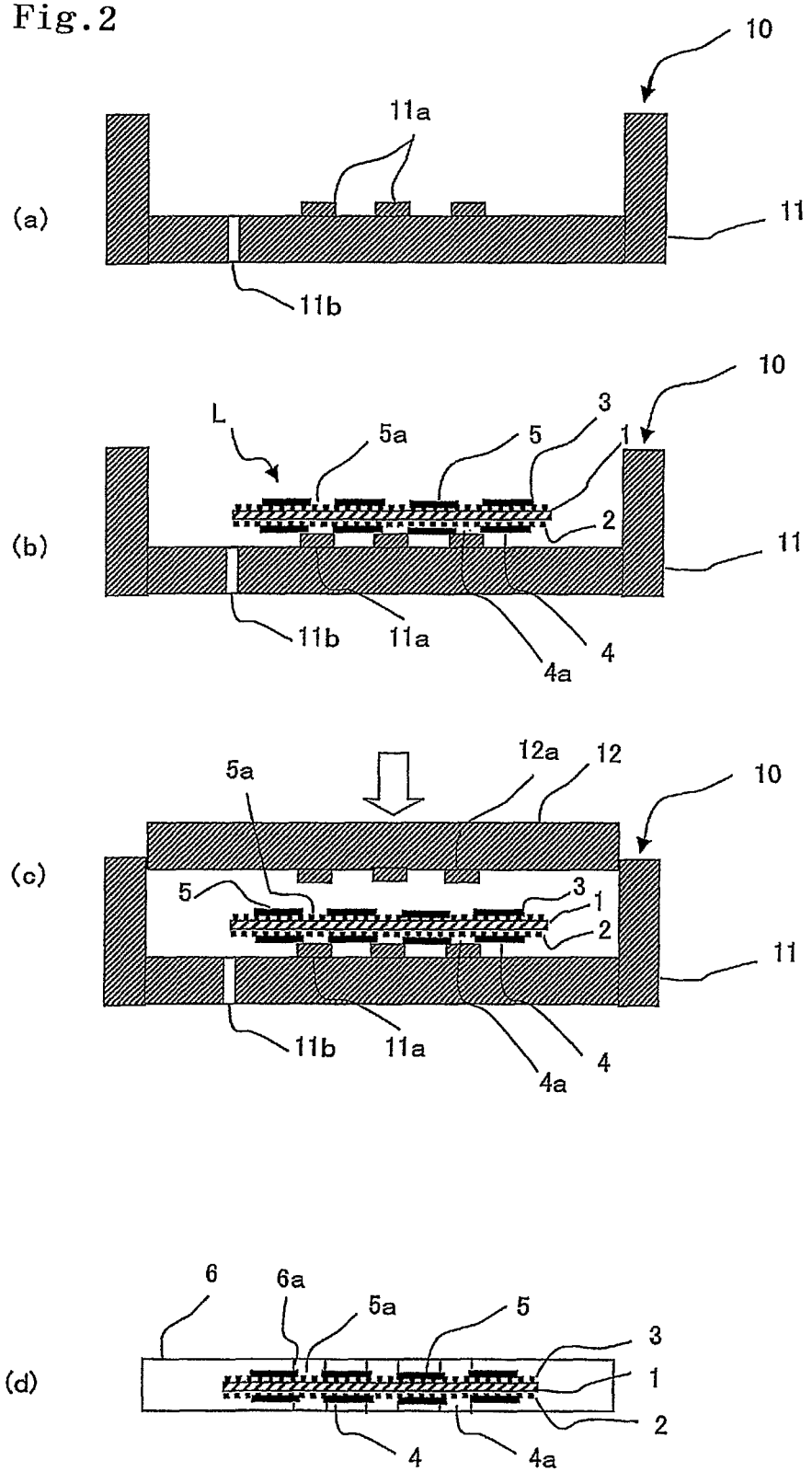
FIG. 2 The figures are sectional front views illustrating an example of the fuel cell manufacturing method of the invention.

Use was made of the platinum-catalyst-carried carbon paper piece produced as described above, and a NAFION film (NAFION 112, manufactured by DuPont; 33 mm×12 m×50 µm in thickness) as a solid polymer electrolyte (cation exchange membrane). Mold parts were used on both surfaces thereof to hot-press the two at 135° C. and 2 MPa for 2 minutes. The thus obtained thin-film electrode assembly was sandwiched between the centers of the two copper plates. A mold as illustrated in FIG. 2 was used, and the assembly was arranged in the mold in the state that a pressure (of 1 ton) was applied to the assembly from both sides of the two copper plates. In this state, a resin (polypropylene resin, J-700 GP manufactured by Prime Polymer Co., Ltd.) was injected into the mold at 195° C. (injection pressure: 400 kgf/cm$^2$), and then cooled. Thereafter, the resin was taken out from the mold to yield a fuel cell wherein the resin molded body had an external size of 39 mm×18 mm×2.1 mm in thickness.

Figure 6:
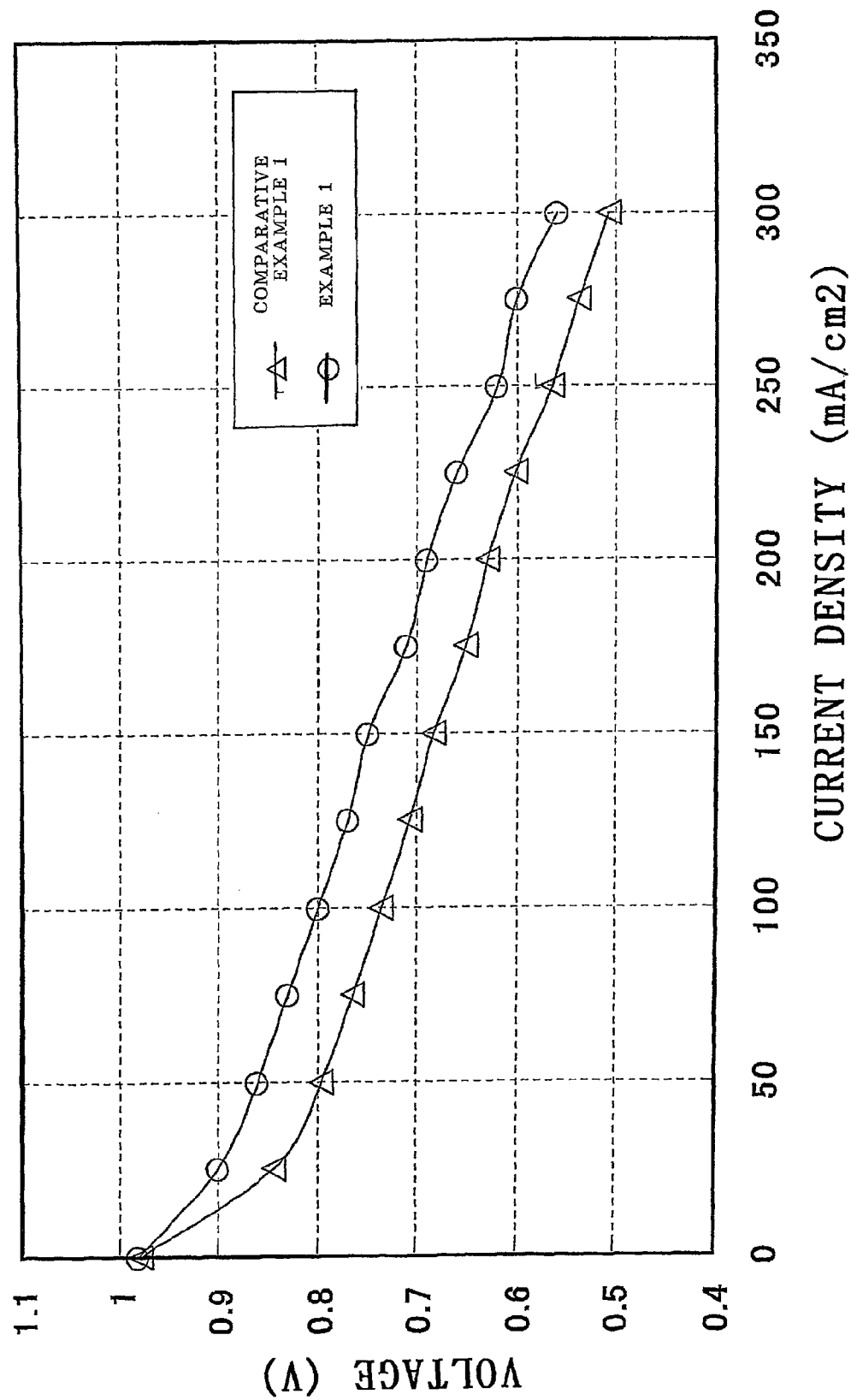
FIG. 6 The figure is a graph showing a change in the outputted voltage of a fuel cell of each of Example 1 and another example.
Figure 7:
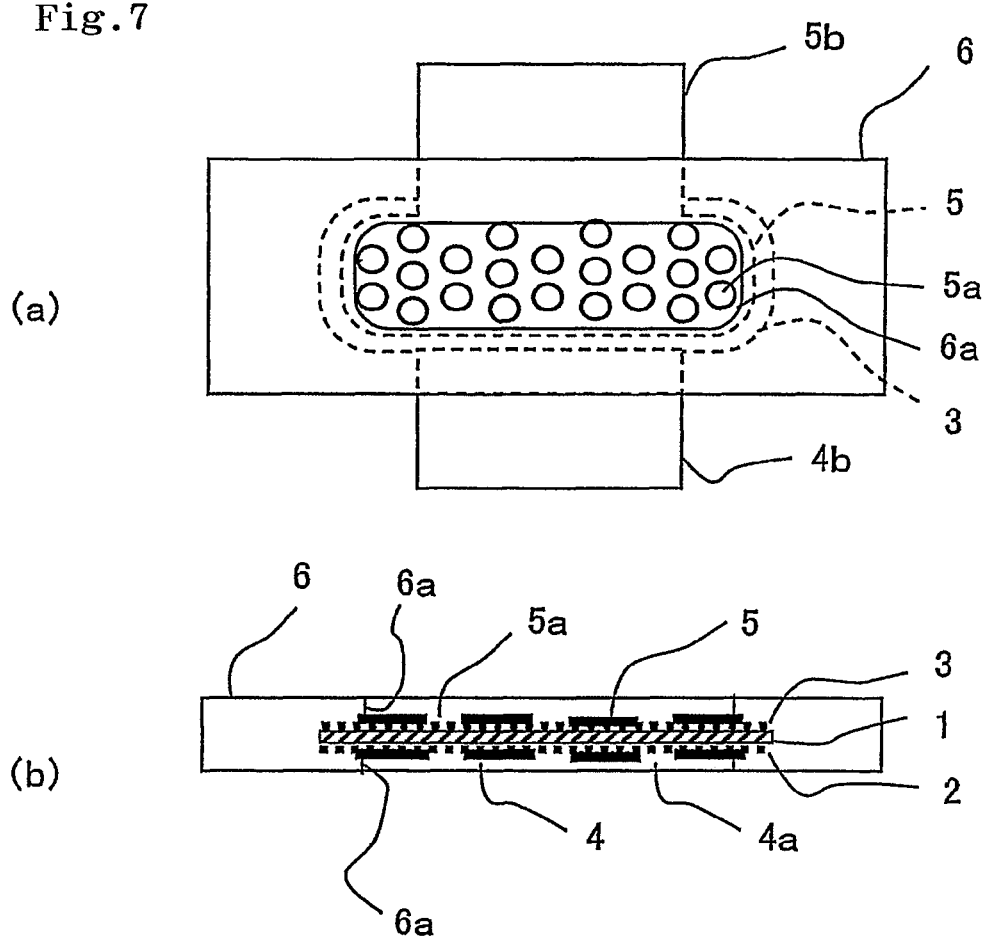
FIG. 7 The figures are views illustrating a different example of the fuel cell of the invention.

This fuel cell was used, and set to an evaluating tool having an inner space for the anode side thereof and making the cathode side open to the atmosphere. Hydrogen was supplied at 12 mL/minute to the anode side inner space to generate electric power. The cell characteristic at the time was evaluated. About the cell characteristic, a fuel-cell-evaluating system manufactured by Toyo Corp. was used to measure a change in the outputted voltage while the electric current was changed. The change in the outputted voltage at the time is shown in FIG. 6. From this result, it was understood that the outputted voltage was improved by about 20% according to a comparison thereof with that of a fuel cell sealed up by fastening its metallic plates onto each other (Comparative Example 1).

Comparative Example 1

A fuel cell was produced and evaluated in the same way as in Example 1 except that SUS plates plated with gold were used instead of the copper plates in Example 1; the sizes of the SUS plates were each made larger (cathode side size: 35 mm×14 mm; and anode side size: 39 mm×18 mm) than the size of the electrodes; the NAFION film was also made larger (39 mm×18 mm) than the carbon paper piece; and the circumferences of the SUS plates were fastened onto each other to seal up the cell while a NAFION film was interposed therebetween not to cause any short circuit. A change in the outputted voltage at this time is shown in FIG. 6.

REFERENCE NUMERALS

1 solid polymer electrolyte layer
2 first electrode layer
3 second electrode layer
4 first metallic layer (first electroconductive layer)
4*a* openings (uncovering regions)
5 second metallic layer (second electroconductive layer)
5*a* openings (uncovering regions)
6 resin molded body
6*a* openings
7 preliminary molded body
7*a* openings
10 mold
11*a* convex portions
12*a* convex portions
C unit cells
L lamination
J joint regions

The invention claimed is:
1. A fuel cell, comprising a solid polymer electrolyte layer, first and second electrode layers located on each of both sides of the solid polymer electrolyte layer, and first and second electroconductive layers arranged outside the first and second electrode layers, respectively, the individual layers being integrated with each other through a resin molded body which is an insert-molded body having at least one opening, such that all the individual layers are embedded within the resin molded body with the resin completely in contact with said layers including outer circumference thereof except where said at least one opening is present, such that all of the individual layers are integrated with each other through the resin molded body, wherein the first electroconductive layer comprises a first metallic layer having a plurality of open holes for making the first electrode layer partially uncovered and for supplying a gas or liquid to the first electrode layer, and the second electroconductive layer comprises a second metallic layer having a plurality of open holes for making the second electrode layer partially uncovered and for supplying a gas or liquid to the second electrode layer, and the resin in the resin molded body has contacted the first and the second electrode layers through at least one opening hole among the plurality of open holes in the first and second metallic layers such that an exposed portion of the first and second electrode layer through the plurality of open holes in the first and second metallic layers has been partially sealed, wherein the percentage of the area of an uncovered portion in the first metallic layer is from 10 to 50%, and the percentage of the area of an uncovered portion in the second metallic layer is from 10 to 50%, wherein the at least one opening is configured to supply a gas or liquid to the first and second electrode layer, and the at least one opening is provided at a position corresponding to at least one of the plurality of open holes in the first or second metallic layer.

2. The fuel cell according to claim 1, wherein a porous layer is interposed between the openings in the resin molded body and the first or second electrode layer.

3. A fuel cell wherein unit cells that are each the fuel cell according to claim 1 are integrated with each other through the resin molded body.

4. The fuel cell according to claim 3, wherein the unit cells are arranged in parallel to each other in the same plane.

5. The fuel cell according to claim 3, comprising one or more joint regions for connecting the electroconductive layers of the unit cells electrically to each other, the joint regions being integrated with each other through the resin molded body.

6. The fuel cell according to claim 5, wherein the first electroconductive layer of one of any adjacent two of the unit cells, the second electroconductive layer of the other, and the joint region are constituted by a metallic layer made of a continuous metallic plate.

7. A method for manufacturing a fuel cell, comprising: a step of arranging, into a mold, a lamination of a solid polymer electrolyte layer, first and second electrode layers located on each of both sides thereof, and first and second metallic layers arranged outside the first and second electrode layers, respectively, and said first metallic layer having a plurality of open holes for making the first electrode layer partially uncovered and for supplying a gas or liquid to the first electrode layer, and said second metallic layer having a plurality of open holes for making the second electrode layer partially uncovered and for supplying a gas or liquid to the second electrode layer, wherein the percentage of the area of an uncovered portion in the first metallic layer is from 10 to 50%, and the percentage of the area of an uncovered portion in the second metallic layer is from 10 to 50%; and a step of injecting a resin into the mold in the state that the first and second metallic layers are pressured from both the sides, thereby molding a resin molded body having at least one opening for integrating the elements of the lamination with each other such that all the individual layers are embedded within the resin molded body with the resin completely in contact with said layers including outer circumference thereof except where said at least one opening is present, such that all of the individual layers are integrated with each other through the resin molded body, the resin molded body having at least one opening which is provided at the position corresponding to at least one of the plurality of open holes in the first or second metallic layer for supplying a gas or liquid to the first and second electrode layers body and the resin in the resin molded body has contacted the first and the second electrode layers through at least one opening hole among the plurality of open holes in the first and second metallic layers such that an exposed portion of the first and second electrode layer through the plurality of open holes in the first and second metallic layers has been partially sealed.

8. The fuel cell manufacturing method according to claim 7, wherein the mold is made into divided structures, one or more convex portions are located in an inner surface of the divided mold members, and in the state that the convex portion(s) is/are brought into contact with the first or second metallic layer under pressure, the resin is injected into the mold.

9. The fuel cell manufacturing method according to claim 8, wherein each of convex portions having a larger upper surface than each of the open holes is positioned corresponding to each of the open holes.

10. The fuel cell manufacturing method according to claim 7, wherein the lamination, and one or more laminations equivalent to the lamination are arranged in the mold in the state that the electro conductive layers of any one of the laminations and the other or another of the laminations are electrically connected to each other through one or more joint regions.

\* \* \* \* \*